(12) United States Patent
Lawrence et al.

(10) Patent No.: US 12,590,867 B2

(45) Date of Patent: Mar. 31, 2026

(54) SYSTEM AND METHOD FOR EVALUATING CONTINUOUSLY VARIABLE TRANSMISSION

(71) Applicant: BPG Sales and Technology Investments, LLC, Ada, MI (US)

(72) Inventors: Jon D. Lawrence, Williamsburg, MI (US); Landon W. Potts, Ada, MI (US)

(73) Assignee: BPG Sales and Technology Investments, LLC, Shelby Township, MI (US)

( * ) Notice: Subject to any disclaimer, the term of this patent is extended or adjusted under 35 U.S.C. 154(b) by 0 days.

(21) Appl. No.: 18/760,366

(22) Filed: Jul. 1, 2024

(65) Prior Publication Data

US 2025/0003832 A1 Jan. 2, 2025

Related U.S. Application Data

(60) Provisional application No. 63/524,487, filed on Jun. 30, 2023.

(51) Int. Cl.
G01M 13/023 (2019.01)

(52) U.S. Cl.
CPC ................................. G01M 13/023 (2013.01)

(58) Field of Classification Search
CPC .................................................. G01M 13/023
See application file for complete search history.

(56) References Cited

U.S. PATENT DOCUMENTS

| | | | |
|---|---|---|---|
| 4,635,472 | A | 1/1987 | Scourtes |
| 7,603,893 | B2 | 10/2009 | Bitzer et al. |
| 2005/0068522 | A1 | 3/2005 | Dorrance et al. |
| 2011/0051151 | A1 | 3/2011 | Dorrance et al. |
| 2014/0240518 | A1 | 8/2014 | Lewinnek et al. |
| 2015/0338313 | A1* | 11/2015 | Tanaka ................ G01M 17/007 |
| | | | 701/32.8 |

(Continued)

FOREIGN PATENT DOCUMENTS

| | | | | |
|---|---|---|---|---|
| CN | 101175971 A | 5/2008 | | |
| CN | 101963519 A | * 2/2011 | ............... | G01F 9/00 |

(Continued)

OTHER PUBLICATIONS

PCT/IB2024/056434 written opinion filed Oct. 10, 2024, pp. 1-5. (Year: 2025).*

(Continued)

*Primary Examiner* — Tisha D Lewis

(74) *Attorney, Agent, or Firm* — Gardner, Linn, Burkhart & Ondersma LLP

(57) ABSTRACT

A system and method of evaluating a continuously variable transmission (CVT) on a vehicle includes positioning a vehicle having a CVT on a test stand, where the test stand includes rollers for receiving wheel assemblies of the vehicle, and with the vehicle further including a drivetrain and an electronic system that includes a transmission controller. The vehicle is operated on the test stand whereby wheel assemblies of the vehicle are rotated via the drivetrain of the vehicle. A computer acquires data from the electronic system of the vehicle while the vehicle is being operated on the test stand with the data used to determine whether the CVT is operating acceptably based on the acquired data.

19 Claims, 5 Drawing Sheets

(56)                    References Cited

U.S. PATENT DOCUMENTS

| 2016/0161602 | A1 | 6/2016 | Prokhorov |
| 2017/0003197 | A1 | 1/2017 | Meinhardt et al. |
| 2017/0336289 | A1 | 11/2017 | Pfister |
| 2019/0310162 | A1 | 10/2019 | Pfeiffer et al. |
| 2020/0239010 | A1 | 7/2020 | Corghi |
| 2020/0348403 | A1 | 11/2020 | Valois et al. |
| 2021/0389763 | A1 | 12/2021 | McArthur et al. |

FOREIGN PATENT DOCUMENTS

| CN | 103398674 | A |   | 11/2013 | |
| CN | 104389996 | A | * | 3/2015 | ......... G01M 13/023 |
| CN | 104634321 | A |   | 5/2015 | |
| CN | 104748971 | A |   | 7/2015 | |
| CN | 107957341 | A | * | 4/2018 | ........... G01M 13/02 |
| CN | 207717375 | U |   | 8/2018 | |
| CN | 108667894 | A |   | 10/2018 | |
| CN | 110513359 | A | * | 11/2019 | |
| DE | 102013211210 | A1 |   | 12/2014 | |
| EP | 3686551 | A1 |   | 7/2020 | |
| JP | H102726 | A |   | 1/1998 | |
| JP | 2017-040475 | A |   | 2/2017 | |
| JP | 2019-020350 | A |   | 2/2019 | |

OTHER PUBLICATIONS

European Search Report from corresponding European Patent Application No. 22736704.2, dated Nov. 6, 2024.

* cited by examiner

SYSTEM AND METHOD FOR EVALUATING CONTINUOUSLY VARIABLE TRANSMISSION

CROSS REFERENCE TO RELATED APPLICATION

The present application claims priority of U.S. provisional application Ser. No. 63/524,487 filed Jun. 30, 2024, which is hereby incorporated herein by reference in its entirety

BACKGROUND AND FIELD OF THE INVENTION

The present invention is directed to a system and method for evaluating continuously variable transmissions, in particular evaluating a continuously variable transmission of a vehicle on a test stand.

Continuously variable transmissions (CVTs) are known and are a form of automatic transmission for a vehicle, such as a passenger vehicle, where the CVT can change through a continuous range of gear ratios as opposed to a conventional automatic transmission that has a number of gears that each set a particular gear ratio. CVTs enable a vehicle engine to operate at or within a particular range of optimal RPMs (revolutions per minute) with the vehicle moving at different velocities. For example, this may include operating the engine at or within a particular range of optimal RPMs at which the engine is generating a desirable power or torque level, or fuel consumption level.

SUMMARY OF THE INVENTION

The present invention provides a system and method for rapidly evaluating the operational performance of a CVT in a vehicle, and is particularly useful for evaluating such a transmission in a used vehicle.

According to an aspect of the present invention, a method of evaluating a continuously variable transmission (CVT) on a vehicle comprises positioning a vehicle having a CVT on a test stand, where the test stand comprises rollers for receiving wheel assemblies of the vehicle, and the vehicle includes a drivetrain, and an electronic system comprising a transmission controller. The method further includes operating the vehicle on the test stand such that wheel assemblies of the vehicle are rotated via the drivetrain of the vehicle, acquiring data with a computer from the electronic system of the vehicle during the step of operating the vehicle on the test stand, and determining whether the CVT is operating acceptably based on the acquired data.

In particular aspects of the method, the acquired data comprises data from the transmission controller, such as a target pulley gear ratio of the CVT and an actual pulley gear ratio of the CVT. The acquired data may additionally or alternatively comprise the rotational speed of a pulley of the CVT, such as either a primary pulley of the CVT and/or a secondary pulley of the CVT, such as a target speed and/or an actual speed of a pulley of the CVT, such as either a primary pulley of the CVT and/or a secondary pulley of the CVT. The step of determining whether the CVT is operating acceptably can involve analyzing the acquired data, such as for example, comparing a target pulley gear ratio of the CVT relative to an actual pulley gear ratio of the CVT and/or comparing a target speed of one or both of the primary or the secondary pulleys of the CVT to an actual speed of the respective pulley or pulleys, and/or may comprise comparing the acquired data to a predetermined acceptable criteria.

In accordance with a still further aspect, the step of determining whether the CVT is operating acceptably may comprise evaluating the acquired data via an evaluation program, such as an evaluation program residing on the computer.

The step of operating the vehicle on the test stand may comprise operating the vehicle by a person while the vehicle is on the test stand, and/or may further or additionally comprise accelerating the vehicle, such as from zero to a highway speed, such as in the range of 60 mph to 80 mph. The step of determining whether the CVT is operating acceptably may include analyzing at least a portion of the acquired data.

Still further, determining whether the CVT is operating acceptably may comprise determining whether the CVT is slipping, including such as determining whether a pulley of the CVT is slipping relative to a belt of the CVT. The step of determining whether the CVT is slipping may further comprise determining whether the primary pulley of the CVT is slipping relative to the belt and/or the secondary pulley is slipping relative to the belt.

According to another aspect of the present invention, a system for evaluating a CVT on a vehicle comprises a test stand having rollers for receiving wheel assemblies of a vehicle equipped with a CVT, where the test stand is configured to enable a drivetrain of the vehicle to drive wheels of the vehicle while disposed on the test stand, and includes a computer configured to be operably connected to an electronic system of the vehicle, where the electronic system comprises a transmission controller, and where the computer is configured to receive data from the electronic system during operation of the vehicle on the test stand, and the system is further configured to determine whether the CVT is operating acceptably based on the acquired data. In particular embodiments the system is operable to perform the above discussed method.

The present evaluation method and system may be used to evaluate CVTs in vehicles, including whether the CVT is operating within predetermined requirements and may be further employed to diagnose particular components within the CVT that are subject to slipping. These and other objects, advantages, purposes and features of this invention will become apparent upon review of the following specification in conjunction with the drawings.

DESCRIPTION OF THE PREFERRED EMBODIMENTS

Figure 1:
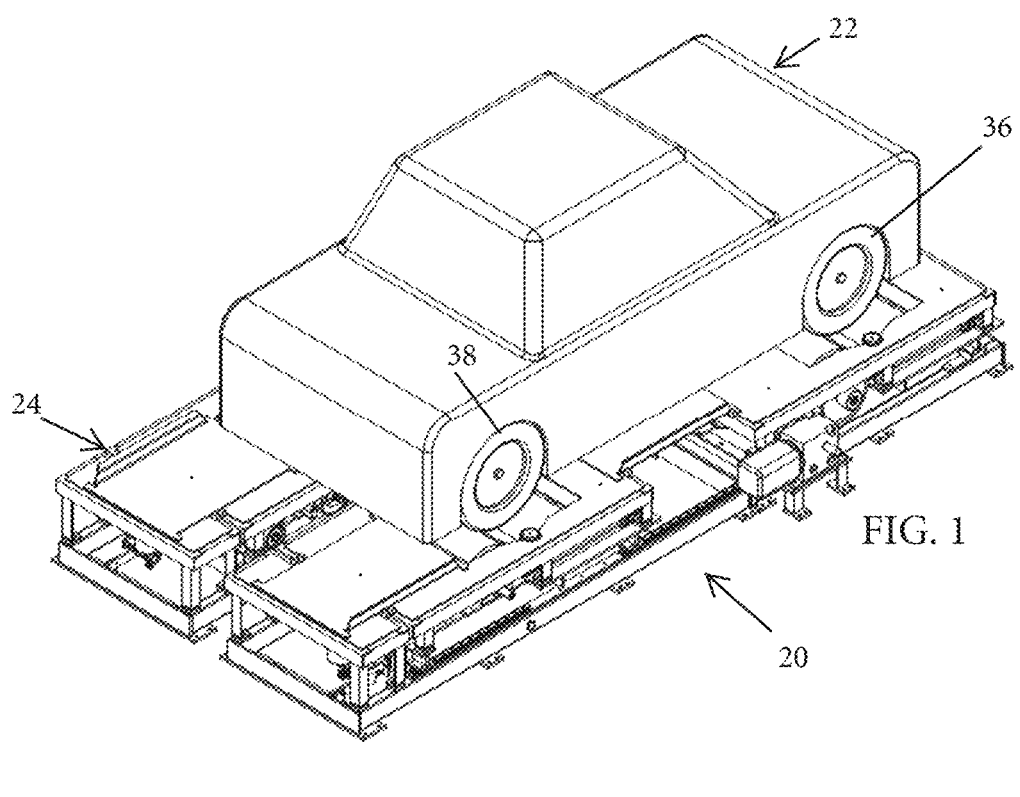
FIG. 1 is a perspective view of a vehicle with a continuously variable transmission (CVT) disposed on a test stand for evaluation.
Figure 2:
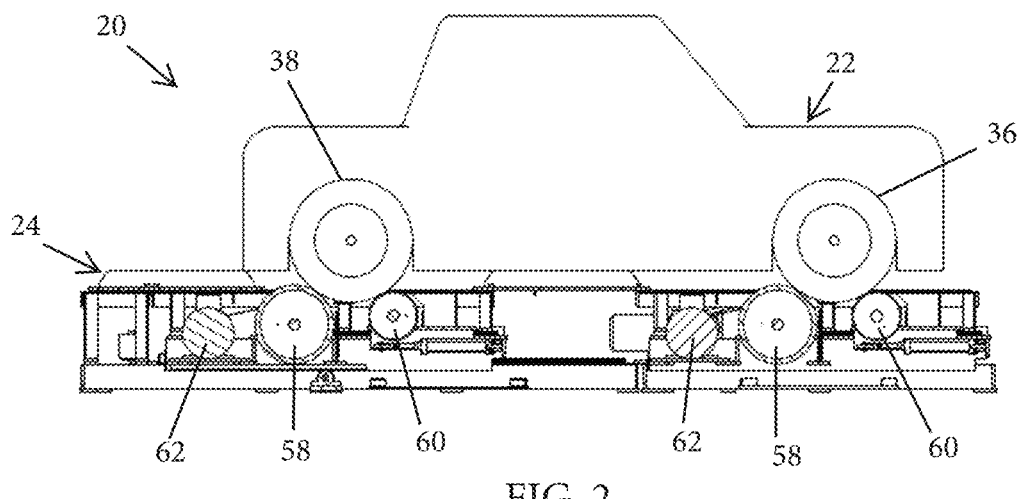
FIG. 2 is a side elevation view of the vehicle and test stand of FIG. 1.

The present invention will now be described with reference to the accompanying figures, wherein the numbered elements in the following written description correspond to like-numbered elements in the figures. FIGS. 1 and 2 illustrate a system 20 for evaluating a vehicle 22 on a test stand 24, and in particular system 20 is used for evaluating a continuously variable transmission ("CVT") 26 (FIG. 3) of vehicle 22 by way of reading on-board diagnostic parameter IDs ("PIDs") from the electronic system 28 of vehicle 22 while operating on test stand 24. In the illustrated embodiment, as discussed in detail below, CVT 26 comprises a conventional CVT transmission and includes a pair of variable diameter pulleys 30, 32 about which a belt 34 is disposed, where in the illustrated embodiment pulley 30 comprises a primary pulley and pulley 32 is a secondary pulley. Vehicle electronic system 28 provides commands to CVT 26 to effectuate a particular desired gear ratio for pulleys 30, 32 based on driving conditions, including load, throttle position and the like. In operation, system 20 monitors and compares actual pulley gear ratios to the targeted or specified pulley gear ratios via readings from electronic system 28, such as under particular test conditions or parameters, to thereby assess whether one or more of pulleys 30, 32 are slipping relative to belt 34.

Figure 3:
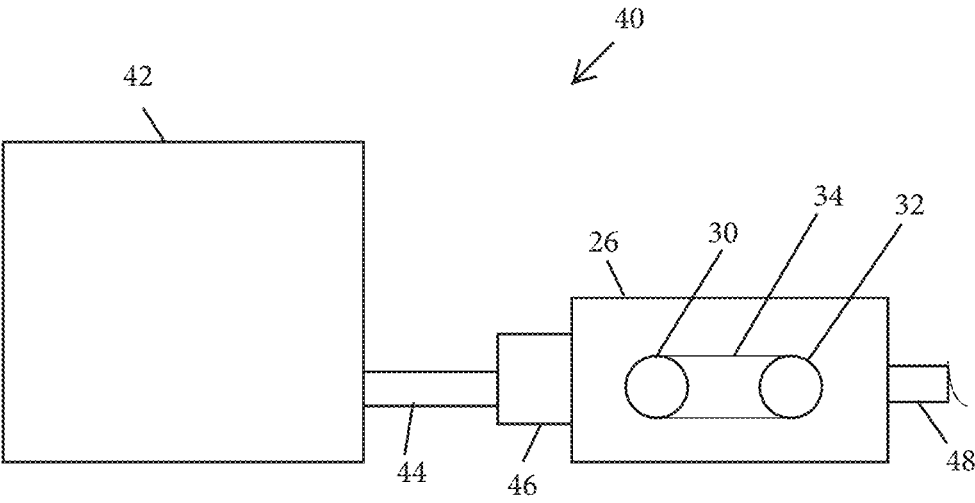
FIG. 3 is a schematic partial illustration of the powertrain of the vehicle of FIG. 1.

As noted, vehicle 22 includes CVT 26, where vehicle 22 includes front and rear tire and wheel assemblies 36, 38 and a drivetrain or powertrain 40 (FIG. 3). Vehicle 22 may be configured to be front wheel drive, rear wheel drive, all-wheel drive or the like. As understood from FIG. 3, in addition to CVT 26, powertrain 40 includes an engine 42 having a crankshaft 44 coupled to a torque converter 46 joined with CVT 26. A driveshaft 48 is connected with CVT 26 and extends to drive one or more wheel assemblies 36, 38 of vehicle 22, such as via a differential. In the illustrated embodiment, pulley 30 is configured as a primary or input pulley and pulley 32 is configured as a secondary or output pulley. Although connected by what is referred to herein as a belt 34, it should be appreciated that belt 34 encompasses use of either a belt or a chain drive connection between pulleys 30, 32, or another such connection for imparting drive motion from the primary pulley 30 to the driven pulley 32.

Figure 4:
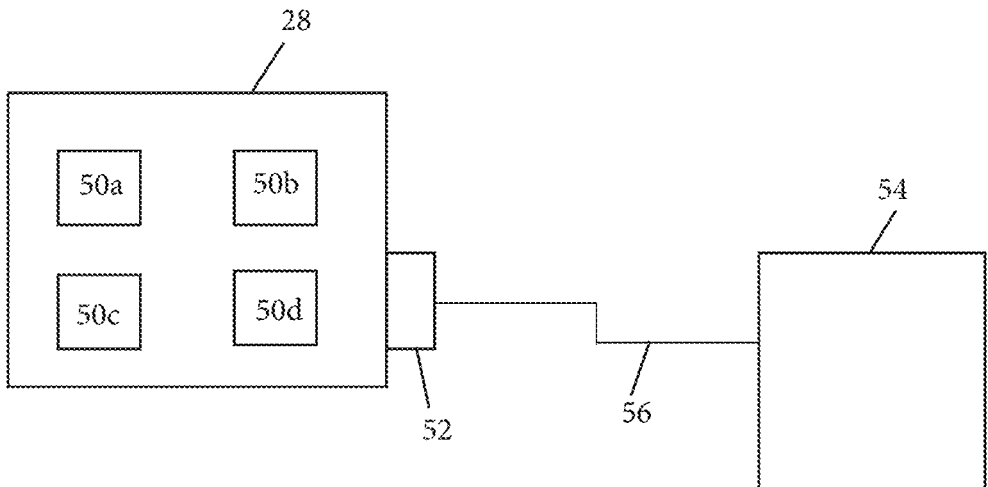
FIG. 4 is a schematic partial illustration of the electrical system of the vehicle of FIG. 1 connected with a diagnostic computing device.

With reference to FIG. 4, electronic system 28 of vehicle 22 is shown as including numerous electronic control units (ECUs) or controllers 50a-50d, which are schematically herein illustrated and it should be appreciated that vehicle 22 may include alternative numbers of ECUs or controllers other than the illustrated at 50a-50d. An onboard diagnostic data port 52, such as may be referred to as a data link connector (DLC) or diagnostic connector, or diagnostic data link connector, is provided whereby a diagnostic computer or reader 54 may connect to the electronic system 28 such as via a cable 56 connection to thereby obtain and/or exchange data with electronic system 28. In particular, computer 54 is configured to obtain data via parameter IDs ("PIDs"), such as via a controller area network (CAN bus), related to vehicle systems, sensors, data and other parameters of the electronic system 28. Computer 54 may be configured as a laptop, tablet computer, handheld device, or the like, and may comprise multiple computer units, including such as for use in exchanging data between various vehicle communication protocols.

As understood from FIGS. 1 and 2, test stand 24 is configured as a roll-brake stand having pairs of rollers 58, 60 that rotationally support front and rear tire and wheel assemblies 36, 38. Vehicle 22 is configured to be operated on stand 24 such that powertrain 40 drives one or more of rollers 58, 60, where the rollers 58, 60 may provide rolling resistance to the driven wheels of vehicle 22 strictly via inertial resistance, or alternatively, electric motors 62 coupled with rollers 58 of stand 24 may be employed to provide additional resistance to driven wheels of vehicle 22. Although stand 24 is shown in the illustrated embodiment as having four pairs of rollers 58, 60 for each of the wheel assemblies 36, 38 of vehicle 22, it should be appreciated that an alternatively configured stand may have fewer such pairs of rollers, such as two forward sets for a front wheel drive vehicle. It should further be appreciated that alternatively configured and arranged roll brake stands or dynamometers may be employed within the scope of the present invention.

During operation of vehicle 22, electronic system 28 transmits commands to CVT 26, such as via a transmission control module or transmission controller 50a, that establish a target or desired pulley gear ratio (PGR) of primary and secondary pulleys 30, 32 for driving of vehicle 22, such as based on load conditions, throttle positions and other factors. Correspondingly, electronic system 28 detects data to determine the actual PGR of primary and secondary pulleys 30, 32 based on rotational speeds of pulleys 30, 32, such as detected RPM of pulleys 30, 32.

In accordance with embodiments of the present invention, with vehicle 22 being operated on stand 24, computer 54 is used to obtain data from electronic system 28 via PIDs related to both the target PGR and the actual PGR, with this data then being compared to evaluate the condition of CVT 26. For example, the comparison of target PGR and actual PGR is used to evaluate whether either or both of the pulleys 30, 32 are slipping relative to belt 34. That is, with the CVT 26 being directed by the transmission controller to operate at a given condition, a comparison of the actual operating condition is used to evaluate whether CVT 26 is operating as directed or within an acceptable deviation therefrom.

In one embodiment, vehicle 22 is tested by an operator sitting in vehicle while on test stand 24, with the operator depressing the vehicle throttle (accelerator pedal) by foot action. The throttle position may be maintained in a sufficiently low position, i.e. engine load, to maintain a constant engine RPM as vehicle speed increases. The constant engine RPM is maintained within reason by the operator—that is, within the control level of the operator, which may be in the range of approximately plus or minus 200 RPM from the target. This range may be a predetermined control range that is monitored during testing with indications and/or an alert provided to the operator during an evaluation procedure. In particular, operating the vehicle in a sufficiently low throttle position averts the CVT transmission controller 50a from simulating a conventional multi-speed automatic transmission. In certain vehicles equipped with a CVT, for example, the vehicle transmission controller will increase engine RPMs upon an operator depressing the throttle to provide driver feedback based on an accustomed engine response with a multi-speed automatic transmission in such a way that the CVT transmission controller 50a thus simulates a conventional automatic transmission. By maintaining a sufficiently low throttle position this simulation is avoided. Still further, test stand 24 is configured to provide a similar road-load level to drivetrain 40 via roll inertia of rollers 58, 60, or optionally via torque applied from motor 62.

In a particular embodiment, the vehicle 22 may be accelerated from zero to a vehicle display speed on the speedometer comparable to a highway speed, such as in the range of 60 to 80 mph. It should be appreciated, however, that alternative testing approaches may also be employed, other than accelerating a vehicle from 0 mph to 60 to 80 mph, and including other throttle positions. For example, the high or highway speed may alternatively be in the range of 55 mph or lower. The evaluation procedure may thus entail accelerating from a low or slow speed to a high or highway speed. It should be appreciated, however, that the evaluation system and method in accordance with the present invention may comprise operating the vehicle 22 on the test stand 24 in an alternative manner. Still further, the CVT 26 may be evaluated without the vehicle 22 being operated on the test stand 24, but instead on a road or track.

The operator may observe outputs from electronic system 28 via computer 54 for monitoring operation of vehicle 22 during testing, such as on a display screen 55 (FIG. 9) of computer 54. Alternatively, and/or additionally, computer 54 may be provided with testing program protocols or monitoring displays directed to provide visual or other feedback to operator while conducting tests to guide operator to properly perform or operate the vehicle on stand 24 within predetermined desired parameters, such as throttle position, engine RPM, speed and/or timing. This may aid in obtaining consistent percentage and consistency of the throttle application. For example, during an evaluation procedure in which an operator is evaluating the CVT 26 of vehicle 22 on test stand 24, displays and feedback regarding the evaluation may be presented to the operator via screen 55 of computer 54. Such data may include, for example, engine RPM display and vehicle speed display, as well as step-by-step instructions for performing the evaluation. An evaluation program 74 (FIG. 9) on computer 54 may be used for displaying data and instructions to the operator.

As noted, on-board diagnostic PID data from electronic system 28 is recorded via computer 54 while vehicle 22 is being operated on test stand 24 for purposes of evaluating CVT 26, such as via evaluation program 74. In particular, computer 54 may be used to capture the target PGR, actual PGR, relative throttle position, and vehicle speed. The vehicle speed may be obtained from the PIDs related to the speedometer on vehicle 22 and/or may be obtained from the roll speed of rollers 58 and/or 60 of stand 24.

Figure 5:
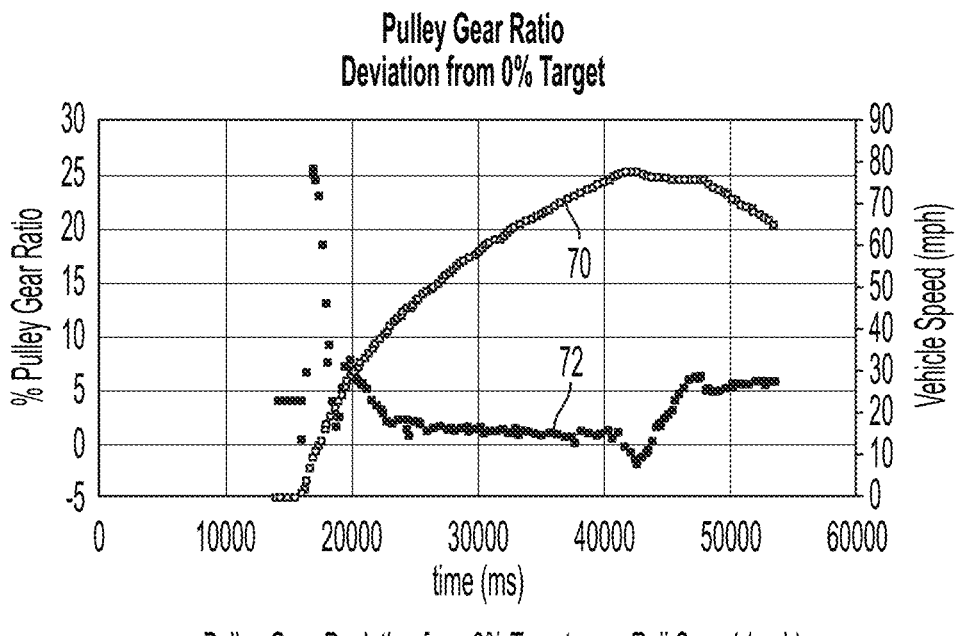
FIG. 5 is an exemplary illustrative graph disclosing CVT pulley ratios relative to vehicle speed over time for a first vehicle.
Figure 6:
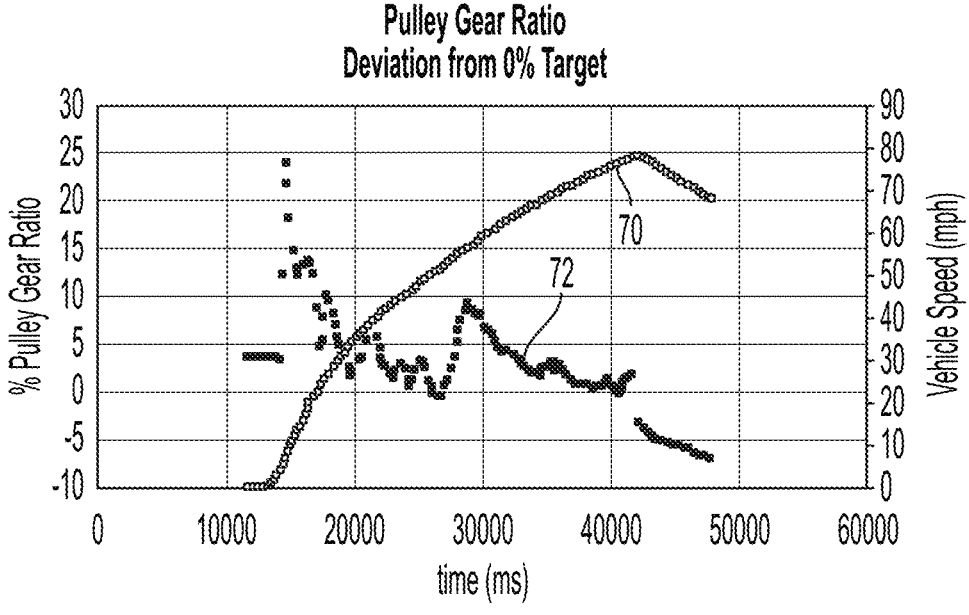
FIG. 6 is an exemplary illustrative graph disclosing CVT pulley ratios relative to vehicle speed over time for a second vehicle.

Data processing of the recorded information may be performed for rendering a determination of the CVT 26 based on the evaluation procedure. With reference to FIGS. 5 and 6, evaluation of the acquired data may comprise graphical evaluation of the deviation of the target PGR to actual PGR are compared relative to vehicle speed for a duration of the evaluation as the vehicle 22 accelerates on the test stand 24. With specific reference to FIG. 5, the vehicle speed data 70 is shown relative to a percentage pulley gear ratio comparison 72 of target PGR data to actual PGR data for a given vehicle 22. The gear ratio comparison 72 may, for example, be calculated as the equation "Target PGR/Actual PGR-1" whereby when the target PGR and actual PGR are equal the plotted result will be zero. The gear ratio comparison plot 72 in FIG. 5 from approximately 23,000 mS to 40,000 mS illustrates a vehicle 22 in which the target PGR and actual PGR are approximately equivalent, thereby providing a generally straight line. Accordingly, this provides an indication that the CVT 26 of the vehicle 22 being tested or under evaluation is performing as desired. That is, there is not a significant deviation between the target PGR and actual PGR whereby the CVT 26 may be deemed as operating within acceptable parameters or specification.

Note that in FIG. 5 when the operator begins to remove his/her foot from the accelerator pedal upon reaching a maximum speed, otherwise known as tip-out, the plotted gear ratio comparison 72 displays an inflection, which is shown after 40,000 mS. Accordingly, evaluation of the data acquired by computer 54 from electronic system 28 may be limited to data acquired prior to tip-out, with the tip-out inflection being used such as by evaluation program 74 to automatically limit the data for evaluation. Similarly, the plotted gear ratio comparison 72 upon initial testing exhibits fluctuation such that initial data may likewise not be considered for the evaluation. Accordingly, data may either not be acquired over the entire range of operation, or not all of the acquired data may be used in the data analysis for evaluating whether the CVT 26 is slipping.

Still further, evaluation of the data may also include adjusting or shifting of the acquired target PGR and actual PGR data relative to each other to accommodate for the mechanical dwell time between gear ratio command signals being issued by the transmission controller 50a to when an actual gear ratio of the pulleys 30, 32 of the CVT 26 is obtained based on the signals from the controller 50a. For example, target PGR data acquired at a given time may be compared to acquired data for the actual PGR that is obtained at a delayed time delta to accommodate for the mechanical dwell time. PID data or signals for the target PGR may be obtained or updated every 50 mS to 100 mS for example, where in contrast it will take some amount of time for the mechanical adjustment of the actual PGR.

FIG. 6 represents a similar comparison of acquired data as disclosed in FIG. 5, but for a different vehicle 22 of the same make and model. As shown in the gear ratio comparison plot 72 of FIG. 6, substantial variation is shown between the target PGR and actual PGR at the equivalent time range between approximately 23,000 mS and 40,000 mS as compared to the gear ratio comparison plot 72 of FIG. 5. This illustrates that the CVT 26 of the vehicle 22 tested in FIG. 6 is not performing as desired, such as due to mechanical slipping of one or more of the pulleys 30, 32 relative to the belt 34.

It should be appreciated that alternative forms of data analysis or comparison for target PGR to actual PGR may be employed. This includes, for example, summing the deltas of the target PGR to actual PGR, such as for every data point, adding the sum of the squares of the deltas, establishing a best fit line of error and calculate PGR deviation from that line, calculating the area under the curve (actual PGR-target PGR) over time, or in other ways and methods.

Still further, it should be appreciated that computer 54 may include one or more programs for directly evaluating the data as discussed above and/or providing feedback to the operator, such as evaluation program 74. For example, the data analysis may be performed by the computer 54 via program 74 and an indication provided to the operator as to whether or not the CVT is deemed as performing acceptably based on pre-established criteria. For example, the program may provide a textual indication or color, such as a green or red indication of passed or failed. Although data such as in the form of graphs 5 and 6 may be displayed for an operator, the CVT evaluation system of the computer 54 and evaluation program 74 may perform the data analysis and provide an indication to the operator as to whether or not the CVT 26 is deemed as performing acceptably, such as based on pre-established criteria programmed within program 74 and against which the data is compared or evaluated.

Figure 7:
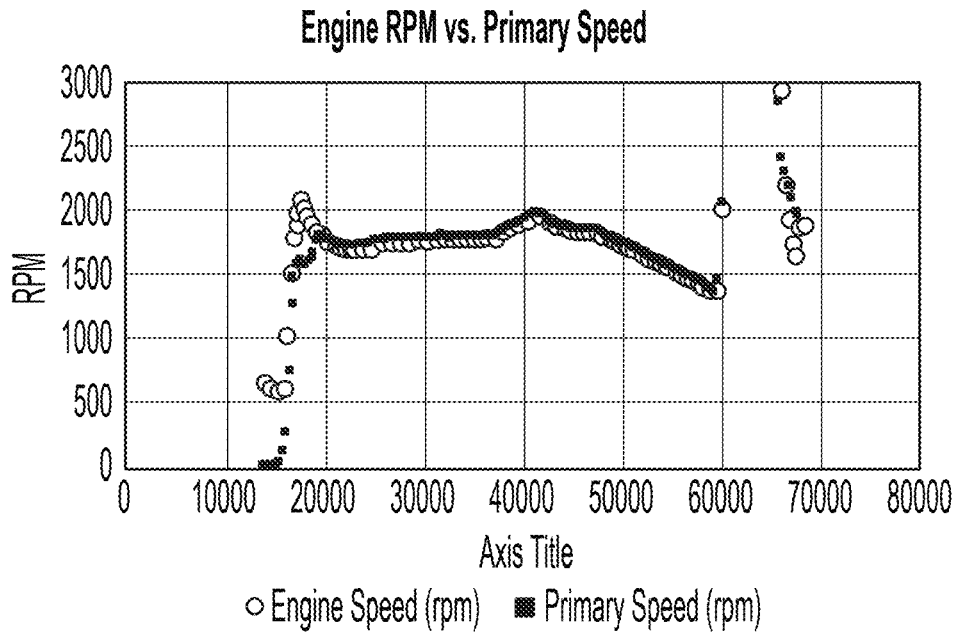
FIG. 7 is an exemplary illustrative graph of engine speed relative to the primary pulley speed of the CVT for a first vehicle.
Figure 8:
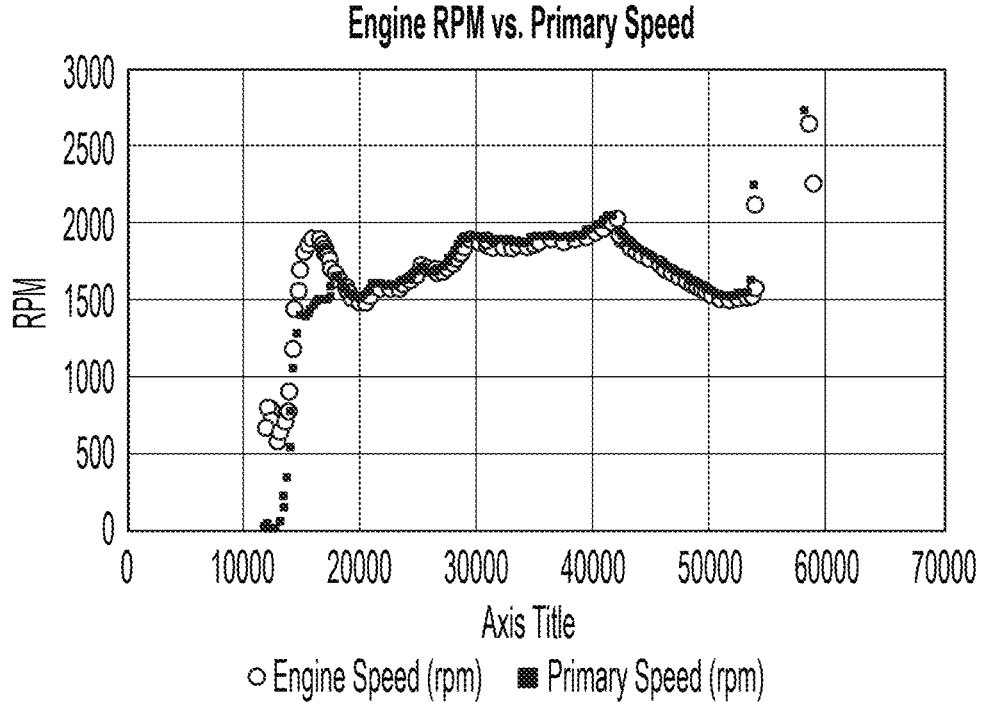
FIG. 8 is an exemplary illustrative graph of engine speed relative to the primary pulley speed of the CVT for a second vehicle.

In the case of a CVT 26 that is determined to be slipping as discussed above, evaluation of the acquired data may also be performed in an effort to determine which of the primary pulley 30 or secondary pulley 32 is slipping relative to belt 34. FIGS. 7 and 8 illustrate data analysis for such purpose based on an evaluation of the engine RPM relative to the primary pulley 30 RPM. To this end, PID data for the speed of the primary pulley 30 and/or secondary pulley 32 may be obtained by computer 54, along with PID data for the engine RPM as discussed above. With specific reference to FIG. 7, the plotted engine RPM and primary pulley 30 RPM for a given vehicle 22 are illustrated as generally smooth and matching in the generally horizontal area between the upper and lower limits, thus indicating that the primary pulley 30 is not slipping. If the CVT 26 was previously determined to be slipping, then based on ruling out slipping of the primary pulley 30 it can be inferred that the secondary pulley 32 is slipping relative to belt 34. With reference to FIG. 8 in contrast, the plotted engine RPM and primary pulley 30 RPM for a different vehicle 22 have numerous deflections or bumps over the similar portion as compared to FIG. 7. This indicates that the primary pulley 30 is slipping, with the torque convertor 46 being of sufficient rigidity that it passes this jutter back into the crankshaft 44, thereby effecting the engine RPM. Although not shown, it should be appreciated that similar data analysis of engine RPM relative to secondary pulley 32 RPM may be performed. Still further, it should be appreciated that the interposing torque converter 46 may play a role in comparing engine RPM and primary pulley 30 speed, such as for example, the torque converter 46 may typically be locked since torque spikes are appreciably lower in non-shifting transmissions. In addition, the actual PGR delta to target PGR may itself be utilized to identify if the primary pulley 30 or secondary pulley 32 is slipping. The evaluation of the acquired data to determine which of the primary pulley 30 or secondary pulley 32 is slipping relative to belt 34 may likewise be performed via computer 54 operating an evaluation program, such as evaluation program 74.

Figure 9:
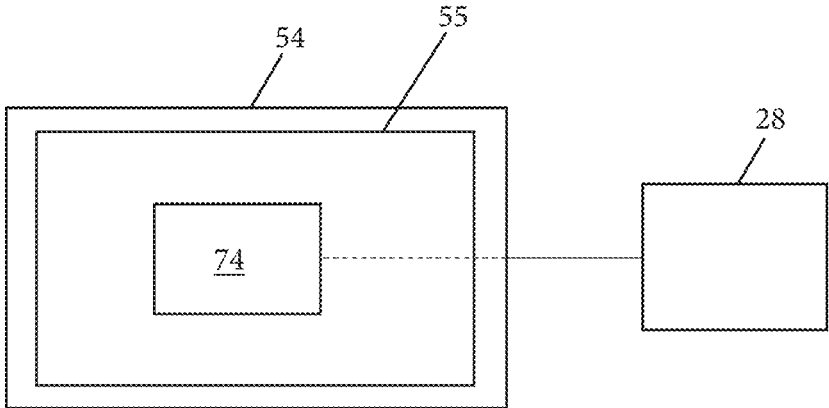
FIG. 9 is a schematic illustration of a software program for analyzing acquired data in accordance with an aspect of the present invention.

FIG. 9 schematically depicts an evaluation program 74 residing on computer 54 that performs data analysis on PID data, such as target PGR, actual PGR, engine speed, primary and secondary pulley speed, as well as time, as discussed above. It should be appreciated that program 74 may be a single program or multiple program modules operating together. Still further, as discussed above, program 74 may provide guidance to an operator for operating the vehicle 22 on test stand 24, as well as provide textual and/or visual indicator of whether or not the CVT 26 of the vehicle 22 is deemed acceptable. The evaluation of whether or not a CVT 26 is acceptable based on the data analysis may be preset limits established in program 74, which may be obtained by statistical analysis of a number of vehicles of the same make and model, and or vehicles with the same CVT transmission, or other such comparative determination. For example, the predetermined established limits may be based on an acceptable deviation in actual PGR to target PGR. Still further, although illustrated herein as using a computer 54 proximate to vehicle 22 for performing the data analysis, it should be appreciated that more than one computer may be employed, including scenarios in which data is transmitted to a remote computer for performing the data analysis.

The CVT evaluation system 20 in accordance with aspects of the present invention thus includes a test stand 24 on which a vehicle 22 is operated while collecting and/or monitoring data from the electronic system 28 of the vehicle 22 via a computer 54 and evaluation program 74. The method includes driving the vehicle 22 onto the test stand 24 and operating the vehicle 22, such as within predetermined limits or parameters on the test stand 24. The method further includes collecting data from the electronic system 28 of the vehicle 22, such as with computer 54 under operation of evaluation program 74, and processing the data for evaluating the CVT.

Changes and modifications in the specifically described embodiments can be carried out without departing from the principles of the present invention which is intended to be limited only by the scope of the appended claims, as interpreted according to the principles of patent law including the doctrine of equivalents.

The invention claimed is:

1. A method of evaluating a continuously variable transmission (CVT) on a vehicle comprising:

positioning a vehicle on a test stand, wherein the test stand comprises rollers for receiving wheel assemblies of the vehicle, and wherein the vehicle includes a drivetrain comprising a CVT, and includes an electronic system comprising a transmission controller;

operating the vehicle on the test stand whereby wheel assemblies of the vehicle are rotated via the drivetrain of the vehicle, wherein said operating comprises accelerating the vehicle from a first speed to a second speed, and wherein the second speed is higher than the first speed;

acquiring with a computer data from the electronic system of the vehicle during said operating the vehicle on the test stand from the first speed to the second speed, wherein the computer is separate from the vehicle itself and is operatively connected to the electronic system of the vehicle to acquire the data; and determining with the computer whether the CVT is operating acceptably based on the acquired data, wherein said determining comprises determining whether a belt of the CVT is slipping relative to a pulley of the CVT and comprises comparing the acquired data to a predetermined acceptable criteria.

2. The method of claim 1, wherein the acquired data comprises data from the transmission controller of the vehicle.

3. The method of claim 1, wherein the acquired data comprises a target pulley gear ratio of the CVT and an actual pulley gear ratio of the CVT.

4. The method of claim 1, wherein the acquired data comprises the rotational speed of either a primary pulley of the CVT and/or a secondary pulley of the CVT.

5. The method of claim 1, wherein said determining comprises analyzing the acquired data by comparing a target pulley gear ratio of the CVT relative to an actual pulley gear ratio of the CVT.

6. The method of claim 1, further comprising applying a load to the drivetrain by one or more of the rollers of the test stand via a motor of the test stand that is coupled with the one or more of the rollers.

7. The method of claim 1, wherein said determining comprises evaluating the acquired data via an evaluation program residing on the computer.

8. The method of claim 1, wherein said operating the vehicle on the test stand comprises operating the vehicle by a person while the vehicle is on the test stand.

9. The method of claim 6, wherein the load is applied during said operating the vehicle on the test stand.

10. The method of claim 1, wherein accelerating the vehicle to the second speed comprises accelerating the vehicle to a highway speed.

11. The method of claim 1, wherein said determining comprises analyzing a portion of the acquired data.

12. The method of claim 1, wherein said determining whether the CVT is slipping comprises determining whether the primary pulley of the CVT is slipping relative to the belt and/or the secondary pulley is slipping relative to the belt.

13. A method of evaluating a continuously variable transmission (CVT) on a vehicle comprising:

positioning a vehicle having a CVT on a test stand, wherein the test stand comprises rollers for receiving wheel assemblies of the vehicle, and wherein the vehicle comprises a drivetrain, and an electronic system comprising a transmission controller;

operating the vehicle on the test stand whereby wheel assemblies of the vehicle are rotated via the drivetrain of the vehicle, wherein said operating comprises accelerating the vehicle from a first speed to a second speed, and wherein the second speed is higher than the first speed;

acquiring with a computer data from the electronic system of the vehicle during said operating the vehicle on the test stand from the first speed to the second speed, wherein the computer is separate from the vehicle itself and is operatively connected to the electronic system of the vehicle, and wherein the acquired data comprises a target pulley gear ratio of the CVT and an actual pulley gear ratio of the CVT; and determining with the computer whether the CVT is operating acceptably based on the acquired data, and wherein said determining comprises analyzing the acquired data by comparing the target pulley gear ratio of the CVT relative to the actual pulley gear ratio of the CVT.

14. The method of claim 13, wherein the acquired data comprises data from the transmission controller of the vehicle.

15. The method of claim 13, wherein the acquired data further comprises the rotational speed of either a primary pulley of the CVT and/or a secondary pulley of the CVT.

16. The method of claim 13, wherein said analyzing the acquired data comprises comparing the acquired data to a predetermined acceptable criteria.

17. A system for evaluating a continuously variable transmission (CVT) on a vehicle comprising:

a test stand having rollers for receiving wheel assemblies of a vehicle equipped with a CVT, wherein the test stand is configured to enable a drivetrain of the vehicle to drive wheels of the vehicle while disposed on the test stand;

a computer that is separate from the vehicle and is configured to be operably connected to an electronic system of the vehicle, where the electronic system comprises a transmission controller;

wherein the computer is configured to receive data from the electronic system during operation of the vehicle on the test stand while the vehicle is accelerated from a first speed to a second speed that is higher than the first speed, and wherein the computer is further configured to determine whether the CVT is operating acceptably based on the acquired data by determining whether a belt of the CVT is slipping relative to a pulley of the CVT.

18. The system of claim 17, wherein the acquired data comprises a target pulley gear ratio of the CVT and an actual pulley gear ratio of the CVT, and wherein the system is configured to determine whether the CVT is operating acceptably by comparing the target pulley gear ratio of the CVT relative to the actual pulley gear ratio of the CVT.

19. The system of claim 18, wherein the acquired data further comprises the rotational speed of either a primary pulley of the CVT and/or a secondary pulley of the CVT.

* * * * *